United States Patent [19]

Roberts

[11] 4,022,187
[45] May 10, 1977

[54] FLOATING SOLAR HEATER FOR SWIMMING POOLS

[76] Inventor: Marvin A. Roberts, 6225 Melvin Ave., Reseda, Calif. 91335

[22] Filed: Nov. 24, 1975

[21] Appl. No.: 634,858

[52] U.S. Cl. .............................. 126/271; 4/172.12; 9/11 A
[51] Int. Cl.² .......................................... F24J 3/02
[58] Field of Search ........... 126/270, 271; 237/1 A; 4/172.12, 172.13; 9/11 A, 2 A

[56] References Cited

UNITED STATES PATENTS

| 3,072,920 | 1/1963 | Yellott | 126/271 |
| 3,130,406 | 4/1964 | Jones-Hinton et al. | 9/11 A |
| 3,949,095 | 4/1976 | Pelehach et al. | 126/271 |

FOREIGN PATENTS OR APPLICATIONS

| 13,780 | 6/1928 | Australia | 4/172.12 |

Primary Examiner—Kenneth W. Sprague
Assistant Examiner—James C. Yeung
Attorney, Agent, or Firm—Roger A. Marrs

[57] ABSTRACT

A solar heating apparatus is disclosed herein useful as a swimming pool cover whereby the sun's rays can penetrate the apparatus and heat the water therebeneath. The apparatus includes a plurality of individual and separate units of a predetermined geometry which cooperate with each other to cover a given body of water. Each unit includes an upper panel of transparent, plastic material and a bottom panel of opaque, plastic material. The panels are joined at peripheries to provide an integral unit and spacers or ribs are provided to maintain separation between the opposing panel surfaces so that a thermal compartment is defined therebetween. In one form, the bottom panel may be a continuous strip of plastic material shared in common with separate top panels.

5 Claims, 7 Drawing Figures

U.S. Patent May 10, 1977 4,022,187
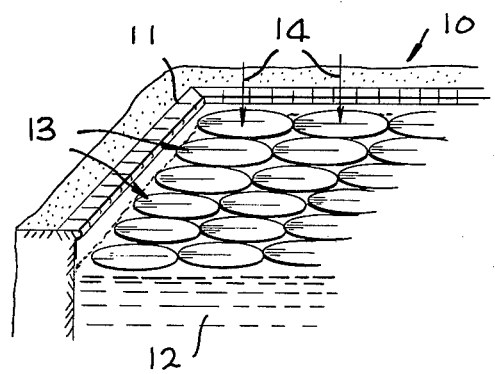
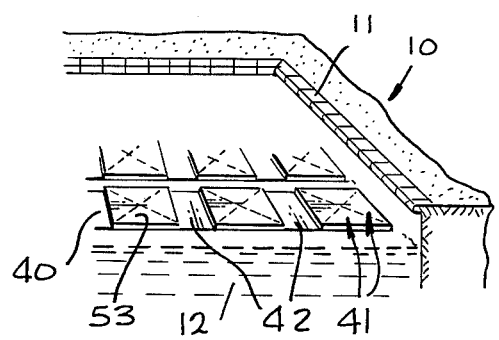
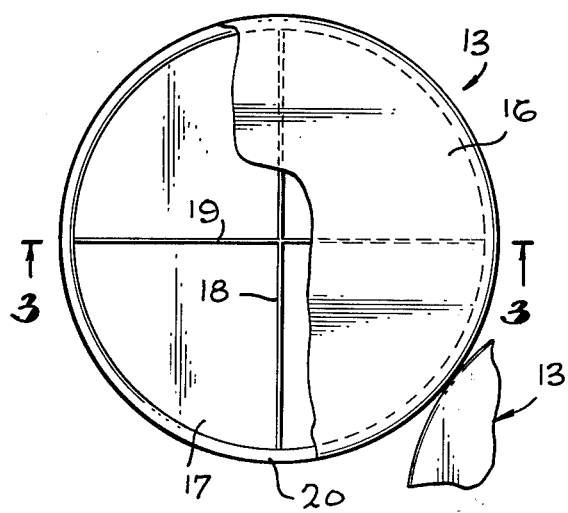
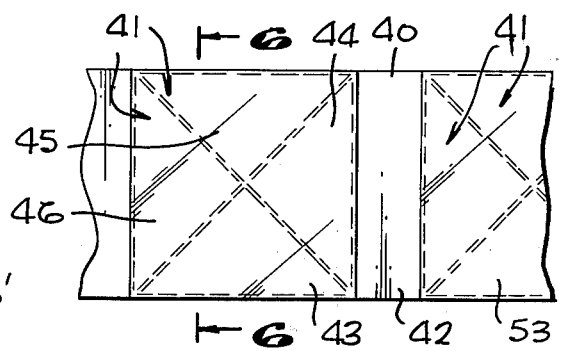
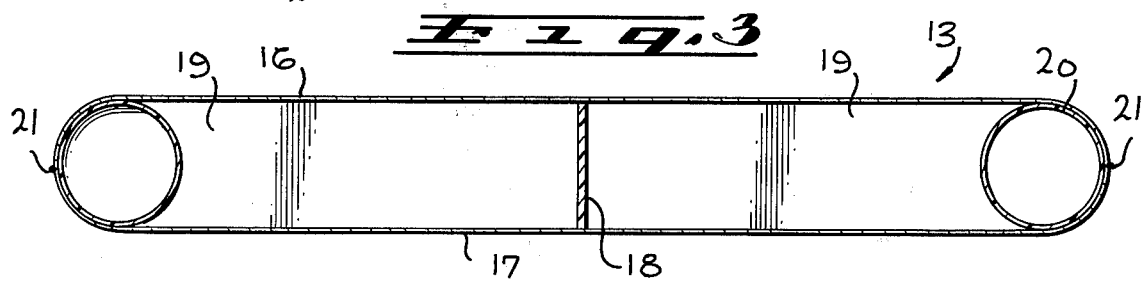
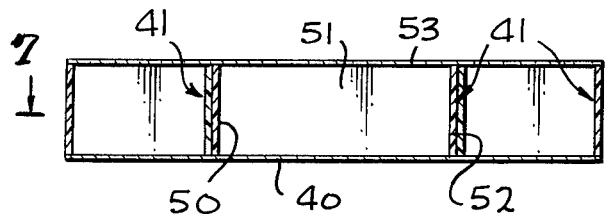
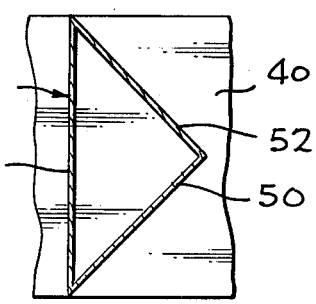

FLOATING SOLAR HEATER FOR SWIMMING POOLS

BACKGROUND OF THE INVENTION

1. Field of the Invention

This invention relates to solar heaters and more particularly to a novel heating apparatus intended to be floated on a body of water whereby the water may be heated via the rays of the sun.

2. BRIEF DESCRIPTION OF THE PRIOR ART

In the past, swimming pools or other large bodies of water have been expensive to heat because of the large volume of water involved and the loss of heat evaporated into the air above the water. Even in warm air climates where the sun heats the water to its desirable temperature during the daytime, the water cools during the night to an undesirable temperature when the ambient temperature drops. Additionally, heat loss is experienced due to the wind passing over the body of water. In colder climates, the temperature of the water is not appreciably increased even during the daytime because of the constant loss of heat to the cool air. Thus, conventional heating equipment is required to maintain a suitable water temperature if there is to be optimum use of a pool and such equipment is costly to install and expensive to operate.

Some attempts have been made to employ solar heating as an expedient for maintaining pool water at a comfortable swimming temperature. These expedients have generally centered around the employment of coils of pipe or tubing exposed on a roof of a building and connected to the pool circulating water supply. Some heat is, in fact, captured by this expedient. However, such a system naturally requires power to pump pool water through the pipes and then back into the pool. In other instances, solar heating have been made utilizing floating units or blankets and such devices are disclosed in U.S. Pat. No. 3,893,443; 3,453,666 and 3,072,920. However, these attempts have their limitations in that the various heat absorbing materials normally employed are heavy and have a tendency to sink below the surface unless adequate means are provided to support the material at the sides and ends. Usually this also means that such a cover must extend entirely across the pool when in use and, consequently, may become cumbersome to remove when the pool is used and to replace it afterwards. Furthermore, many of the floating units that are employed in the prior art do not completely engage or touch each other when riding on the surface of the body of water so that collectively, a substanial surface area of the pool is exposed to the air for radiation of heat into ambient atmosphere. In other instances, the units are not provided with any means for adequate separation between the top and bottom panels so that the top panel is subject to gravity deviation for stretching so that the air filled chamber or compartment separating the opposing surfaces of the top and bottom panels collapses and therefore is not serving its intended purpose.

Therefore, there has been a long standing need to provide a solar heating apparatus which may be readily installed or removed from a surface of a body of water and when so installed, adequately covered and provides a cover for maintaining a body of water in a heated condition.

SUMMARY OF THE INVENTION

In view of the foregoing, the present invention provides a novel solar heating apparatus for maintaining a heated water temperature for a large body of water by providing a plurality of air-filled units so that the plurality of units when properly arranged cover the total surface of the body of water. In one form of the invention, each unit comprises a top and bottom panel of plastic material wherein the top panel is transparent and the bottom panel is opaque and wherein the top and bottom panels are separated by dividers or ribs so that the pair of panels never come into contact thus assuring the presence of an air-filled compartment therebetweeen. The bottom or lower sheet or panel may be of a continuous nature shared in common with a plurality of separate top panels which are which are carried by a rigid frame of rim in spaced-apart relationship.

Therefore, it is among the primary objects of the present invention to provide a novel solar heating apparatus for maintaining the heated temperature of a large body of water.

Another object of the present invention is to provide an improved solar heating means for a large body of water which floats upon the water surface when in use and which is easy to remove from the pool or to install by unskilled persons.

Still another object of the present invention is to provide a novel solar heating apparatus for maintaining pool water temperature which is sufficiently effective in capturing the heat of the sun and transferring the heat to the water beneath.

Another object of the present invention is to provide a solar heating apparatus for maintaining temperature of a body of water which is simple and inexpensive to manufacture and which is readily installed without employment of extensive apparatus.

Still a further object resides in providing a novel solar heating apparatus having a plurality of units of specific geometrical configuration adapted to combine on the surface of the water to maintain the temperature thereof.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings in which:

FIG. 1 is a perspective view of a swimming pool incorporating the novel heating apparatus of the present invention;

FIG. 2 is an enlarged plan view, partially broken away, showing one of a plurality of floating solar heating units employed in the apparatus of FIG. 1;

FIG. 3 is a transverse cross sectional view taken in the direction of arrows 3—3 of FIG. 2;

FIG. 4 is a view similar to the view shown in FIG. 1 illustrating another embodiment of the present invention;

FIG. 5 is a plan view of the solar heating embodiment shown in FIG. 4;

FIG. 6 is a transverse cross sectional view of the solar heating apparatus shown in FIG. 5 as taken in the direction of arrows 6—6 thereof; and FIG. 7 is a transverse cross sectional view of the solar heating element or unit illustrated in FIG. 6 as taken in the direction of arrows 7—7 thereof.

DESCRIPTION OF THE PREFERRED EMBODIMENT

Referring now to FIG. 1, a conventional swimming pool is illustrated in the general direction of arrow 10 which includes a rectangular coping 11 defining the perimeter of the pool which includes a body of water illustrated in general by the numeral 12. Disposed on the surface of the pool 12, there is provided a plurality of individual and separate floating solar heating units such as the unit identified by numeral 13. The respective units are located so as to cover the entire surface of the pool and, perferably, the periphery or edge marginal regions of adjacent solar units touch or engage so that as much of the pool surface is covered as permitted by the particular geometry or shape of the unit. In the present example, a circular solar unit 13 is illustrated. However, it is to be understood that other predetermined configurations may be employed such as squares, rectangular shapes or the like. In this manner, a plurality of air chambers, defined by each of the separate solar heaters, are employed for retaining heat in the pool 12. The impinging sun rays are indicated by arrow 14.

Referring now in detail to FIG. 2, the solar heating unit 13 is illustrated which comprises, in general, a top panel 16 which is composed of a clear, flexible plastic material such as a polyvinyl chloride or other suitable material such as polyethylene or the like. A satisfactory construction utilizes a transparent sheet that is 0.002 to 0.005 inch thick. This same material and thickness is also used to provide a bottom panel 17 which is arranged in fixed spaced apart relationship so that the opposing surfaces of panels 16 and 17 define an air chamber therebetween. Preferably, the internal air chamber is approximately 3¼in height and adequate separation between the opposing surfaces of the panels are provided by means of a rib or spacer arrangement indicated by cross ribs 18 and 19. Also, the entire unit is rigidized by a circular rim 20 which may be a solid tube, a hollow tube or even an inflatable tube. As illustrated, an adjacent solar heating unit 13' is illustrated having its edge marginal regions touching or in engagement with the edge marginal region of the solar heating unit 13.

In FIG. 3, it can be seen that the upper panel 16 is transparent while the bottom or lower panel 17 is opaque, or preferably black. Furthermore, if desirable, the adjacent edge marginal regions of the upper and lower panels are joined together in a seam 21 so that a unitary construction is provided rigidized by the ribs 18 and 19 as well as the rim 20. The opposing surfces of the upper and lower panels 16 and 17 are separated so that an adequate air chamber or space is provided therebetween so that air insulation is provided against heat transfer through the panels from the water through the ambient air. Also, the unit separates the ambient air from the surface of the water so that wind conditions cannot draw heat from the pool surface.

Referring now in detail to FIG. 4, another embodiment of the present invention is illustrated wherein the pool of water 12 is covered by floating solar heating apparatus taking a different form or embodiment than shown in FIG. 1. In the embodiment of FIG. 4, the solar heating apparatus comprises an elongated sheet of opaque plastic material indicated by numeral 40 which is extended between the opposite side walls of the swimming pool 10. The under surface of the sheet 40 rests on top of the water surface and constitutes the bottom panel of the heating unit. The heating units comprise a plurality of triangular shaped unit such as indicated by numeral 41. Preferably, four of these units are arranged together to form a square as illustrated. It is to be noted that each of the squares of rectangular units are separated by each other so that a section or portion of bottom sheet 40 is exposed therebetween. Such a marginal or exposed portion of lower panel or sheet 40 is identified by numeral 42 so that it can be seen that adjacent squares of triangular units are arranged in fixed spaced apart relationship. By this construction, the triangluar units may be individually placed or set on top of the sheet 40 or, if desired, the units may be releasably or permanently attached to the sheet 40. By so placing the units in the manner described, a plurality of sheets 40 carrying the solar heating units may be laid across the surface of the pool so as to constitute a total covering of the pool surface area. When it is desired to place each of the strips and units onto the surface of the pool, these strips need only be unrolled from storage and the solar units placed on top thereof. If the solar units are permanently secured to the sheet, the sheet may simply be folded over wherein the exposed or margin portion 42 constitute folding or hinged areas so that the plurality of solar units may be stacked on top of one another.

Referring now to FIG. 5, an enlarged plan view of the square relationship of triangular solar heating units is illustrated wherein it can be seen that a square is composed of triangle 43, 44, 45, and 46. In FIG. 6, it can be seen that each of the triangular solar units includes a side wall on each side of the triangle as identified by numerals 50, 51 and 52. These side walls maintain a top sheet 53 of transparent plastic material in spaced relationship with respect to the sheets 40 on which the triangular unit is placed. Therefore, a heating chamber or compartment is defined between the opposing surfaces of the top sheet 53 and the lower sheet 40.

As illustrated in FIG. 7, the triangular solar units 41 include the side walls 50–52 inclusive and the side walls are joined at their opposite and adjacent ends to form the geometric configuration.

The solar heating apparatus shown in FIGS. 1 and 4 are bouyant and float in position on the surface of the water. Since the apparatus is transparent at its top panels, sunlight and sun rays are introduced to the air filled compartment. During hours of sunshine, the sun rays 14 penetrate the transparent upper panels of the apparatus and heat the water beneath the apparatus. Since the air within the compartment is heated, there is also conduction heating of the water which lies adjacent to the apparatus. The apparatus provides a good insulating cover to hold the heat in the pool of water. Thus, the apparatus can be placed over the water surface during the day and the water will be warm and suitable for swimming. At night, the apparatus prevents excessive loss to the colder ambient air.

To remove the apparatus from the pool, either the individual heating units 13 of FIG. 1 are individually removed from the surface of the water or, with respect to FIG. 4, the strip 40 is folded over on itself to store the individual heating units therewith. If the individual heating units 41 are not secured to the sheet 40, they may be easily removed by hand and stacked adjacent the edge of the pool.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A bouyant solar heating apparatus in combination with a pool for holding a body of water between opposite sidewalls and end-walls, comprising:

a plurality of separate individual solar heating units having a predetermined complimentary configuration for arrangement about the surface of said body of water so that adjacent ones of said units contact each other at the periphery of said adjacent units;

each of said units having a top panel and a bottom panel of thin flexible plastic material and joined at their respective peripheral edges to define an ambient air-filled compatement between opposing surfaces of said panels;

said top panel being translucent and said bottom panel being opaque whereby the short rays of the sun pass through said top panel for absorption by said bottom panel and the longer rays emitted by said bottom panel are blocked by said top panel so that the short rays are readily converted to heat which is conducted to the surface of the body of water;

a rib structure carried on each of said solar heating units to maintain separation between said opposing surfaces of said panel so as to maintain definition of said air-filled compartment;

said rib structure consists of a rigid member extending about the periphery of each of said solar heating units and in connection therewith to separate said opposing surfaces of said panels immediately at the edge marginal regions thereof and cross member arranged in a frame-like network extending across said air-filled compartment to separate said opposing surface in the center thereof; and said bottom panel of said solar heating units is a single elongated sheet of said plastic material constituting a common bottom panel for said solar heating panels and an exposed portion of said common bottom panel between adjacent ones of said units providing a hingable or foldable member whereby said units are folded over on themselves in a stack for storage and transportation.

2. The invention as defined in claim 1 wherein each of said solar heating units is triangular in shape and at least four of said units are arranged together in cooperation to form a square configuration and each of said square unit configurations are carried on said elongated bottom sheet in spaced apart relationship so as to provide an exposed portion of said bottom sheet between adjacent ones of said square unit configurations.

3. The invention as defined in claim 2 wherein each of said solar heating units in said square unit configuration is fixedly attached to said elongated bottom sheet.

4. The invention as defined in claim 2 wherein said solar heating appartus includes a plurality of said elongated bottom sheets carrying said solar heating units and said plurality are arranged next to each other across the surface of said body of water between the opposite ends of said pool.

5. The invention as defined in claim 4 wherein said top and bottom panels are composed of a thin material within the range of 2–3 mils in thickness.

* * * * *